United States Patent
Paranchych et al.

(10) Patent No.: US 7,110,785 B1
(45) Date of Patent: Sep. 19, 2006

(54) PERFORMING POWER CONTROL IN A MOBILE COMMUNICATIONS SYSTEM

(75) Inventors: David W. Paranchych, Richardson, TX (US); Yiping Wang, Plano, TX (US); Ashvin H. Chheda, Plano, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 1042 days.

(21) Appl. No.: 09/696,491

(22) Filed: Oct. 25, 2000

Related U.S. Application Data

(60) Provisional application No. 60/168,845, filed on Dec. 3, 1999.

(51) Int. Cl.
*H04B 7/00* (2006.01)

(52) U.S. Cl. .................. 455/522; 455/69; 455/437; 455/442; 455/226.2; 455/226.3; 370/318; 370/252; 370/320; 370/358; 370/335; 370/342; 375/358; 375/340; 375/200

(58) Field of Classification Search ............. 455/522, 455/69, 442, 276.2, 276.3, 13.4; 370/335, 370/320, 342, 318; 375/358, 340
See application file for complete search history.

(56) References Cited

U.S. PATENT DOCUMENTS

| | | | |
|---|---|---|---|
| 5,727,033 A * | 3/1998 | Weaver et al. ............ 375/358 |
| 5,812,938 A * | 9/1998 | Gilhousen et al. ........... 455/69 |
| 5,884,187 A * | 3/1999 | Ziv et al. .................. 455/522 |
| 5,933,781 A * | 8/1999 | Willenegger et al. ....... 455/522 |
| 5,933,782 A * | 8/1999 | Nakano et al. ............ 455/522 |
| 6,208,699 B1 * | 3/2001 | Chen et al. ................. 375/340 |
| 6,286,122 B1 * | 9/2001 | Alanara ...................... 714/781 |
| 6,341,224 B1 * | 1/2002 | Dohi et al. ................ 455/522 |

(Continued)

FOREIGN PATENT DOCUMENTS

WO    WO 98/36508    * 8/1998

OTHER PUBLICATIONS

TR 45 TIA/EIA/IS-2000-2, "Physical Layer Standard for cdma2000 Spread Spectrum Systems," pp. i-xxxviii, 1-1 to 3-151 (date unknown).

(Continued)

*Primary Examiner*—Joseph Feild
*Assistant Examiner*—David Q. Nguyen
(74) *Attorney, Agent, or Firm*—Trop, Pruner & Hu, P.C.

(57) ABSTRACT

A mobile communications system includes base stations and mobile units. A power control scheme is provided in which a mobile unit can enter into a discontinuous transmission (DTX) mode. During DTX mode, the mobile unit is not transmitting traffic channels that can be monitored to determine frame errors so that the target ratio of energy per bit to noise spectral density (target Eb/No) can be adjusted. Instead, the base station monitors bit errors of bits in a pilot channel communicated by the mobile unit during DTX mode. Using this technique, the target Eb/No can be adjusted even when the mobile unit is not transmitting traffic channels, so that outer-loop power control can be performed. A number of mechanisms can also be used to detect when a mobile unit has entered DTX mode.

12 Claims, 4 Drawing Sheets

U.S. PATENT DOCUMENTS

| | | | |
|---|---|---|---|
| 6,438,119 B1 * | 8/2002 | Kim et al. | 370/335 |
| 6,463,042 B1 * | 10/2002 | Paatelma | 370/318 |
| 6,490,268 B1 * | 12/2002 | Lee et al. | 370/342 |
| 6,571,104 B1 * | 5/2003 | Nanda et al. | 455/522 |
| 6,590,874 B1 * | 7/2003 | Wang et al. | 370/318 |
| 6,654,613 B1 * | 11/2003 | Maeng et al. | 455/522 |
| 6,671,266 B1 * | 12/2003 | Moon et al. | 370/342 |
| 6,731,948 B1 * | 5/2004 | Lee et al. | 455/522 |

OTHER PUBLICATIONS

TSG-RAN Working Group 1 meeting #8, TSGR1#8(99)g80, "Physical channel BER on DPCCH in UTRA/FDD," pp. 1-4 (Oct. 1999).

TSG-RAN Working Group 1 meeting #7 bis, TSG1#7bis(99)f12, "Physical CH BER on DPCCH in UTRA/FDD," pp. 1-3 (Oct. 1999).

* cited by examiner

PERFORMING POWER CONTROL IN A MOBILE COMMUNICATIONS SYSTEM

This application claims the benefit under 35 U.S.C. § 119(e) to U.S. Provisional Application Ser. No. 60/168,845, entitled "Performing Power Control in a Mobile Communications System," filed Dec. 3, 1999.

TECHNICAL FIELD

The invention relates to performing power control in a mobile communications system.

BACKGROUND

Mobile communications systems, such as cellular or personal communications services (PCS) systems, are made up of a plurality of cells. Each cell provides a radio communications center in which a mobile unit establishes a call with another mobile unit or a wireline unit connected to a public switched telephone network (PSTN). Each cell includes a radio base station, with each base station connected to a mobile switching center that controls processing of calls between or among mobile units or mobile units and PSTN units. In an alternative arrangement, the base stations may be connected to base station controllers that are in turn connected to the mobile switching center.

One type of protocol used in mobile communications is the code-division multiple access (CDMA) protocol, originally implemented as the IS-95 protocol. CDMA is based on a spread-spectrum technique in which multiple users have access to the same band of carriers. This is accomplished by assigning a unique orthogonal code (referred to as the Walsh code) to each mobile unit. To meet requirements for third generation (3G) wireless communications systems, the CDMA technology has been replaced with the CDMA 2000 family of standards. The standards in the CDMA 2000 family include the IS-2000-1, IS-2000-2, IS-2000-3, IS-2000-4, IS-2000-5, and IS-2000-6 (collectively referred to as the "IS-2000 standard").

According to IS-2000, a mobile station may discontinue the transmission of traffic channels to preserve power and reduce interference when there is no data to send. Such a feature is referred to as the discontinuous transmission (DTX) mode. The DTX feature is available on fixed-rate traffic channels, such as the dedicated control channel and supplemental channel, in the reverse link between the base station and each mobile unit. The CDMA air-link is based on a forward link and reverse link between base stations and mobile units. The forward link is the link from the base station to the mobile unit, while the reverse link is the link from the mobile unit to the base station. Among the channels used in the reverse link are the dedicated control and supplemental channels, which are employed to carry traffic frames and other signaling from the mobile unit to the base station.

Conventionally, in performing outer-loop power control without DTX, such as in IS-95 CDMA systems, the target ratio of energy per bit to noise spectral density (referred to as the target Eb/No) is adjusted based on whether errors occurred in receiving frames. A target Eb/No may be specified for each mobile unit. The target Eb/No may be increased when the frame error rate (FER) rises above a predetermined threshold and decreased when the FER falls below a predetermined threshold. Alternatively, adjustment of the target Eb/No may be based on occurrence of frame errors rather than the FER crossing a threshold. By coordinating the step sizes of the increases and decreases in the target Eb/No, a target FER can be achieved.

If the transmission of traffic frames is discontinued, however, the conventional technique of controlling the target Eb/No based on the transmission of traffic frames during the period of silence is not possible, even if the receiver in the base station can detect that the transmission of frames has ceased. The reception of traffic frames is no longer available to determine exactly what target Eb/No is required for a given quality of reception. Without a way of adjusting the target Eb/No, reliable transmission of frames may not be possible when the mobile unit exits DTX mode and starts transmitting traffic frames again.

Setting a fixed target Eb/No does not entirely solve the problem, since the Eb/No required for successful transmission of traffic frames may vary during the period of silence, in which case no frames may be successfully received at the end of the silence period and a dropped call may result. The target Eb/No may alternatively be set to a high value to ensure reception at the end of the silence period. Such a high value may be the worst-case value based on the velocity of the mobile unit and the known channel conditions. However, setting a high target Eb/No may result in the transmission of excessive power on the pilot, traffic, and power control channels, which may significantly reduce the power reduction that is supposed to result from the use of DTX.

Thus, an improved method and apparatus for performing power control is needed in a mobile communications system.

SUMMARY

In general, according to one embodiment, a method of performing power control in a mobile communications system having a base station and a mobile unit comprises detecting an error in reception of predetermined information in a link between the base station and the mobile unit when traffic channels are not being communicated. A power control element is adjusted based on the detected error.

Some embodiments of the invention may have one or more of the following advantages. Effective power control is provided in a link between a mobile unit and a base station, even during periods of silence, such as during discontinuous transmission (DTX) mode. A balance between energy savings and reliable wireless communications can be achieved so that battery life in a mobile unit is extended while the likelihood of dropped calls is reduced.

Other features and advantages become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible. For example, although reference is made to the code-division multiple access (CDMA) protocol in this description other alternative wireless standards can also be employed.

In accordance with some embodiments of the invention, power control, such as outer-loop power control in a CDMA system, can continue to be performed even though transmission of traffic frames in a wireless link between the mobile unit and base station has been discontinued during discontinuous transmission (DTX) mode. Although traffic signaling is discontinued on some traffic channels in DTX mode, control signaling with a known pattern may still be transmitted. Such control signaling may be monitored to detect for errors so that appropriate power control may be performed. In one embodiment, the power control includes adjusting a power control element such as the target ratio of energy per bit to noise spectral density (Eb/No). As used here, a "power control element" refers to any element (e.g., parameter, component, etc.) that can be adjusted to affect the transmission power of signals in wireless links between mobile units and base stations.

Figure 1:
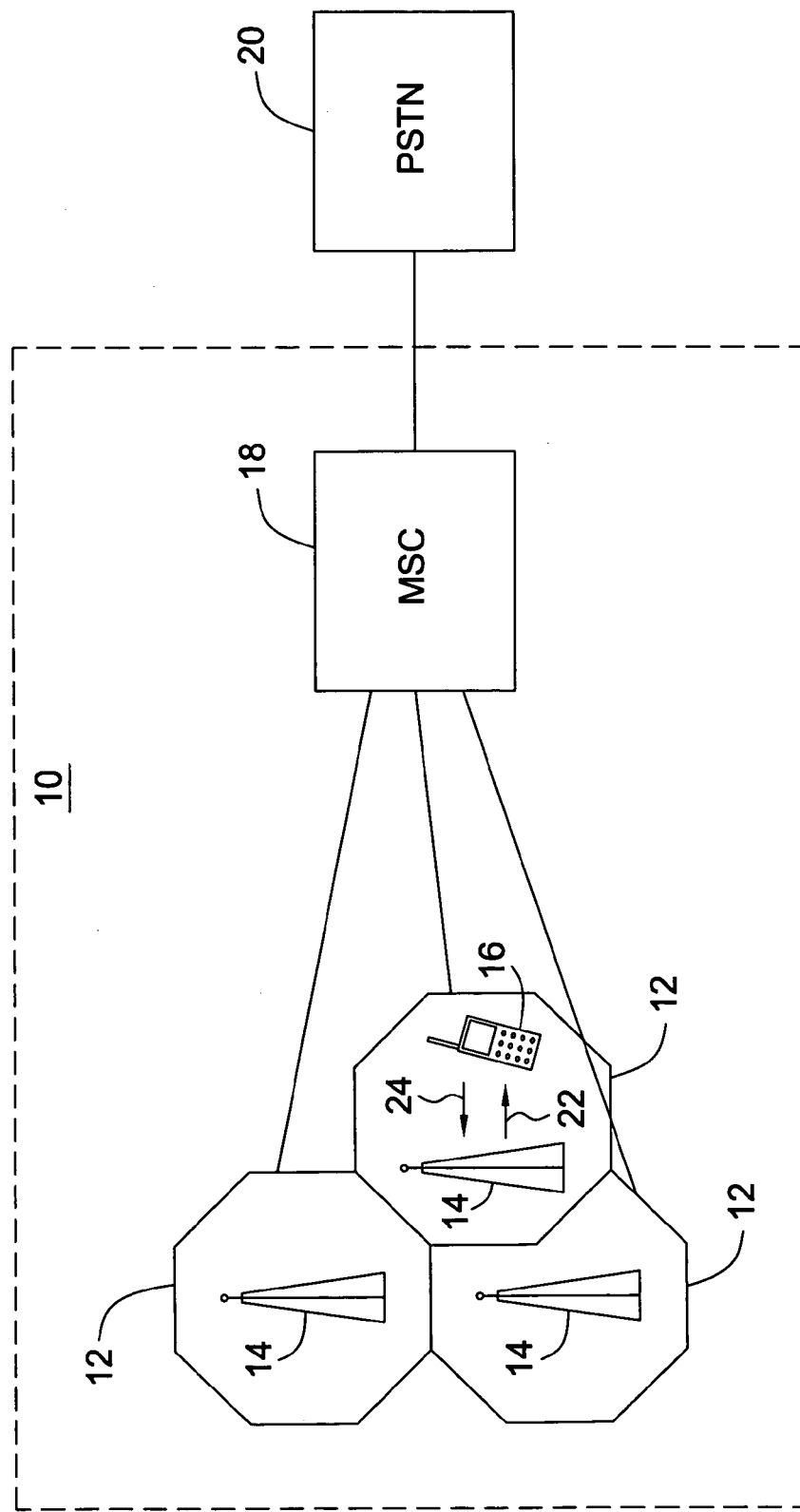
FIG. 1 illustrates an embodiment of a mobile communications system.

Referring to FIG. 1, a mobile communications system 10 according to one example arrangement is illustrated. The mobile communications system 10 includes a plurality of cell segments 12. As used here, "cell segments" may refer to entire cells, cell sectors, or other predefined portions of cells. Each cell segment 12 is associated with a base station 14 that is capable of communicating with one or more mobile units 16 within the geographic area covered by the base station 14.

In one embodiment, the mobile communications system 10 is a code-division multiple access (CDMA) system, such as a CDMA 2000 system. The CDMA 2000 family of standards includes the IS-2000-1, IS-2000-2, IS-2000-4, IS-2000-5, and IS-2000-6 standards.

As the mobile unit 16 crosses from one cell segment 12 to another cell segment, a hand-off procedure is performed by the base stations. CDMA provides for a soft hand-off procedure in which a mobile unit is directed to hand-off to the same frequency and is assigned to an adjacent cell or sector without dropping the original radio frequency (RF) link. During the soft hand-off process, the mobile unit may keep two or more RF links active. In a CDMA system, a RF link refers to a link associated with a given pseudorandom noise (PN) code. CDMA systems also perform softer hand-offs in which mobile units perform hand-offs within different sectors of the same cell site.

The base stations 14 and the cell segments 12 are connected to a mobile switching center (MSC) 18 that provides the main control functions of the mobile communications system 10. In other arrangements, base station controllers (BSCs) may be provided between corresponding groups of base stations 12 and the MSC 18. The MSC 18 may be connected to other MSCs that are responsible for other service areas. The MSC 18 may also be connected to a public switched telephone network (PSTN) 20 that is coupled to wireline units to enable communications between the mobile units 16 and the wireline units.

The air link between each base station 14 and each mobile unit 16 includes a forward link 22 (from the base station to the mobile unit) and a reverse link 24 (from the mobile unit to the base station). According to CDMA 2000, the reverse link 24 includes a pilot channel, a power control subchannel, a traffic channel, and other channels. The traffic channel may include a dedicated control channel (DCCH), fundamental channel (FCH), supplemental channel (SCH), and other channels. The DCCH and SCH in the traffic channel are fixed-rate channels on which DTX mode is available. During DTX mode, the fixed-rate channels in the reverse link 24 are not transmitted to preserve power and to reduce interference. However, transmission of the pilot channel and power control subchannel in the reverse link 24 continues.

The pilot channel in the reverse link 24 (also referred to as a reverse pilot channel) is an unmodulated, direct-sequence spread spectrum signal transmitted continuously by a mobile unit. A reverse pilot channel provides a phase reference for coherent demodulation and may provide a mechanism for signal strength measurement. The reverse power control subchannel is a subchannel on the reverse pilot channel used by the mobile unit to control the power of a base station when operating under certain configurations.

The reverse DCCH is a portion of the reverse traffic channel used in some configurations for the transmission of higher-level data and control information from a mobile unit to a base station. The reverse FCH is also a portion of the reverse traffic channel that carries higher-level data and control information from a mobile unit to a base station. A reverse SCH is a portion of the traffic channel, which operates in conjunction with a reverse FCH or reverse DCCH to provide higher data rate services and on which higher-level data is transmitted. In the forward link 22, the forward traffic channel may also include a forward DCCH, a forward FCH, and a forward SCH.

During active communications of traffic channels between the base station and mobile unit, the base station monitors for occurrence of frame errors in one or more of the reverse DCCH, reverse FCH, and reverse SCH to adjust the target Eb/No in the base station, and the mobile unit monitors one or more of the forward DCCH, forward FCH, and forward SCH to adjust the target Eb/No in the mobile unit. The target Eb/No values determine the frame error rate (FER) on the corresponding channel.

However, when the mobile unit enters DTX mode, the transmitter in the mobile unit 16 can cease transmission of DCCH and SCH traffic frames without warning the base station 14. As a result, the base station 14 is not notified explicitly when transmission of traffic frames has stopped. This results in an outer-loop power control problem, especially if fast power control is being employed.

Once traffic frames stop, conventional techniques of detecting for errors in the reception of traffic frames is not available. As a result, the ratio of energy per bit to noise spectral density (Eb/No) cannot be accurately adjusted by conventional techniques during this period of traffic silence. Typically, the target Eb/No is increased when data is received in error and decreased when data is received correctly. An increase in the target Eb/No results in reduced capacity in a cell due to the likelihood of enhanced interference between mobile units. On the other hand, a decrease in the target Eb/No (and thus transmission power) increases the likelihood that the call may be dropped. To achieve proper outer-loop power control to avoid these issues, in accordance with some embodiments, control signaling instead of the traffic signaling is used to perform adjustment of the target Eb/No value. Also, to enable outer-loop power control based on the control signaling instead of traffic signaling, a mechanism is provided to detect that a mobile unit has entered DTX mode.

In further embodiments, the base station 14 can also enter DTX mode, in which case adjustment of Eb/No by the mobile unit is also based on control signaling rather than traffic channels.

Figure 2:
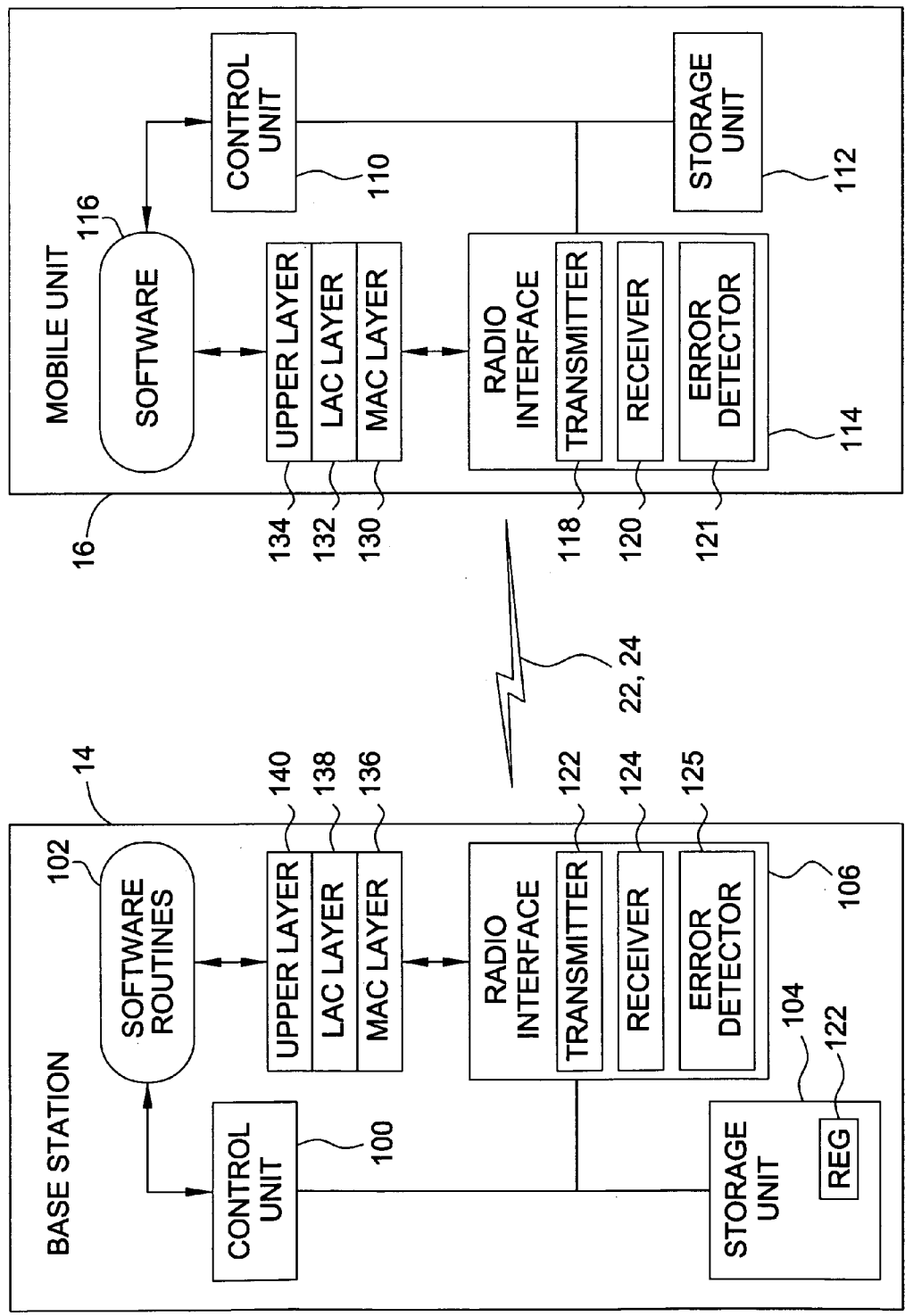
FIG. 2 is a block diagram of components in a mobile unit and base station in the mobile communications system of FIG. 1.

Referring to FIG. 2, the components of a base station 14 and mobile unit 16 are illustrated. In the base station 14, one or more control units 100 may be run under the control of one or more software routines 102. Such software routines may initially be stored in a storage device 104 (or plural storage devices) and executed by the control unit 100 to perform programmed tasks. One of the software routines 102 executable in the base station 14 is a power control routine to perform power control tasks, including outer-loop power control. The control unit 100 is capable of communicating through a radio interface 106 (that includes a transmitter 122 and receiver 124) with the radio links 22, 24.

The base station 14 also includes a medium access control (MAC) layer 136 (containing modules for managing communications on the communications link, in this case, RF links); a signaling link access control (LAC) layer 138 (providing a radio-independent interface and containing modules for controlling data flow and transporting the data flow to the MAC layer 136); and an upper layer 140 including signaling control modules, protocol stacks, and the software routines 102.

In the mobile unit 16, one or more control units 110 are coupled to one or more storage units 112 and to a radio interface 114 (including a transmitter 118 and receiver 120) that is capable of communicating with the air links 22, 24. Software modules 116 may also be executable in the mobile unit 16. In another embodiment, instead of software routine 116, the control unit 110 may be configured in hardware or by firmware to perform pre-programmed tasks. The mobile unit 16 similarly includes a MAC layer 130, a LAC layer 132, and an upper layer 134. As with the base station 14, one of the software modules 116 may be programmed to perform power control tasks.

Figure 3:
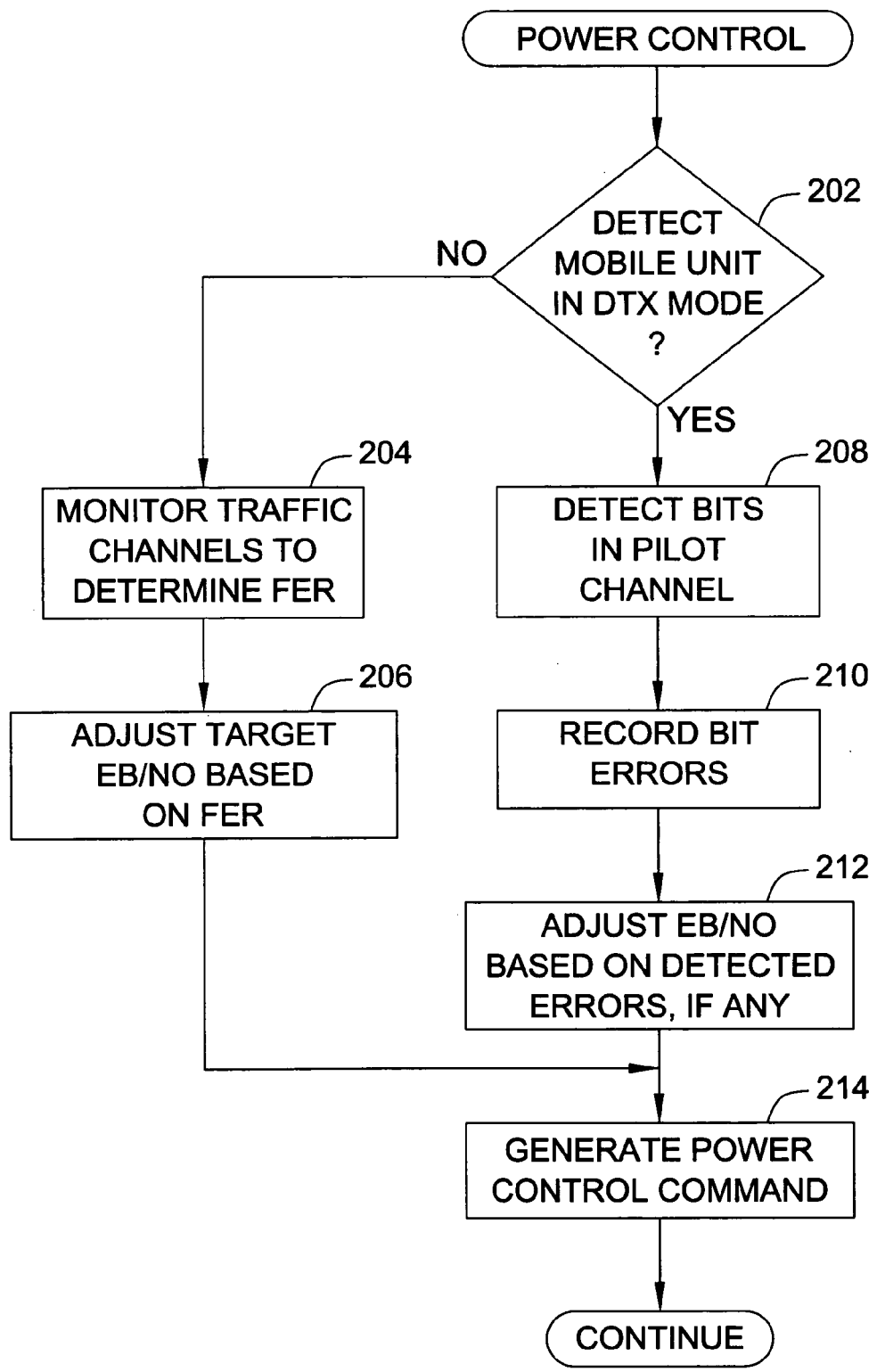
FIG. 3 is a flow diagram of the process of performing outer-loop power control in accordance with an embodiment.

Referring to FIG. 3, the procedure performed by the base station 14 by which outer-loop power control is performed is described. In further embodiments, the same process or some modified form of the process may be performed by the mobile unit 16. The power control routine first detects (at 202) if the mobile unit is in DTX mode. If not, then conventional power control may be performed, in which traffic channels in the reverse link are monitored (at 204) to determine the FER. Based on the determined FER, the target Eb/No ratio is adjusted (at 206). The target Eb/No is increased if the FER rises above a threshold and is decreased if the FER falls below the threshold. Alternatively, outer loop power control may be driven by the occurrence of frame errors rather than by the FER crossing a threshold.

Figure 4A:
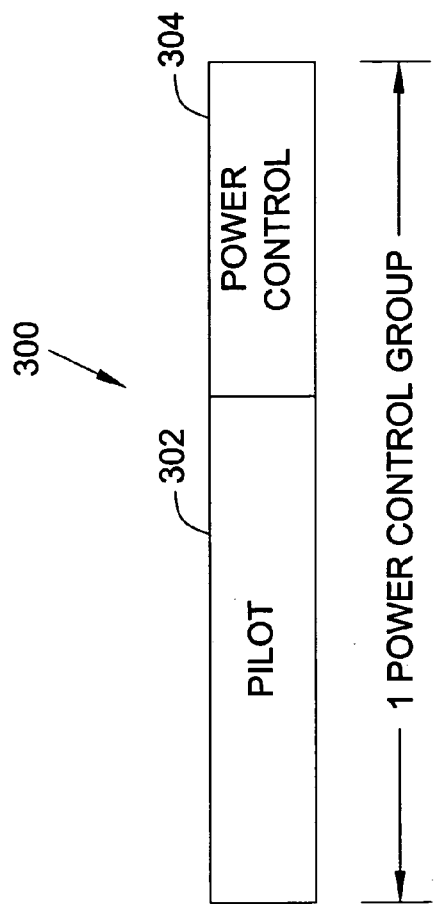
FIGS. 4A–4B illustrate pilot channel and power channel subchannel structures.
Figure 4B:
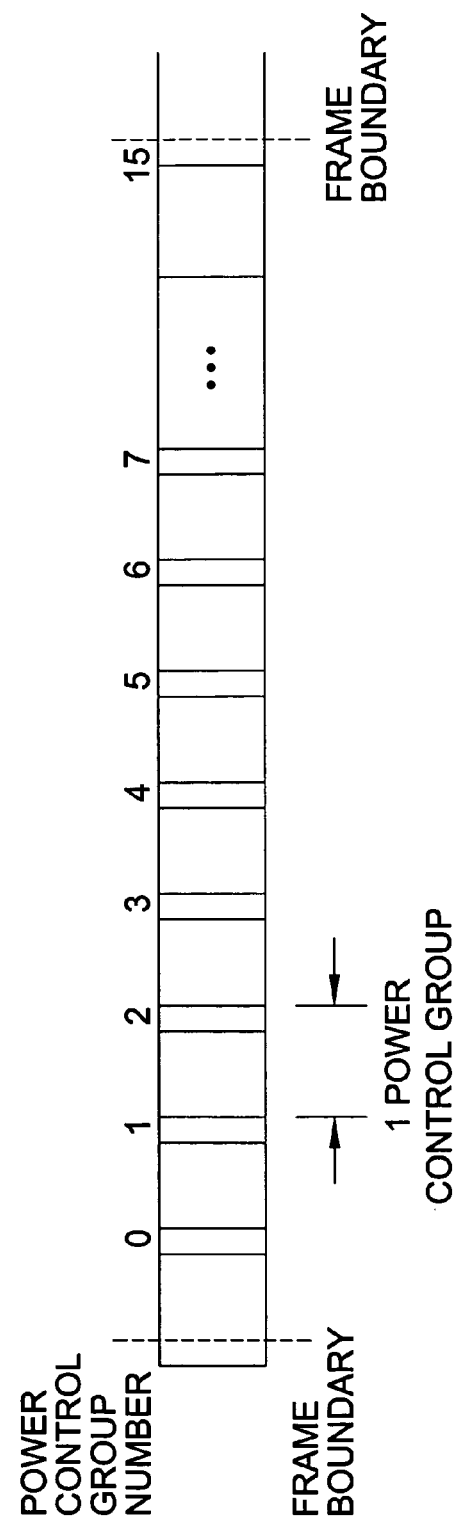

However, if the power control routine determines (at 202) that the mobile unit is in DTX mode, then the base station 14 checks (at 208) for errors in bits received on the pilot channel. As shown in FIG. 4A, on the reverse link according to IS-2000, a power control group 300 includes a power control subchannel 304 that is time multiplexed with a pilot channel 302, with the two transmitted at the same power level. In the power control group 300, the first three-quarters of each interval is allocated to the pilot channel 302, while the last quarter is devoted to the power control subchannel 304. An interval (the length of the power control group 300) in one embodiment is typically about 1.25 milliseconds (ms). The polarity of the power control subchannel 304 is unknown, but the polarity of the pilot channel 302 is known. Therefore, in addition to its role in the recovery of the channel phase and gain, the pilot channel 302 may be used by the base station to detect the BER of the pilot channel 302 (or equivalently, the power control subchannel 304, since the two are sent at the same power).

The predetermined information in the pilot channel 302 includes known values (all ones in one embodiment). If any of the received bits is not at the expected state, then a bit error is recorded (at 210), such as in a storage register 122 in the storage device 104 in the base station 14 (FIG. 2). To detect errors in the pilot channel bits according to one embodiment, an error detector circuit 125 (FIG. 2) is implemented in the radio interface 106. Alternatively, the error detector circuit 125 may be implemented in software (such as in the power control routine) or as a separate component in the base station 14. Each base station 14 performs such detection for each mobile unit 16 (in DTX mode) that the base station 14 is communicating with. The same mobile unit may communicate with multiple base stations 14 due to the possibility of soft hand-off. Thus, for any given mobile unit 16, plural base stations 14 may be performing the tasks described in FIG. 3.

The power control tasks performed in the base station 14, as illustrated in FIG. 3, may also be performed by the mobile unit 16. If the base station 14 enters DTX mode, the control signaling may be monitored to detect for errors. In one example, a user dedicated pilot channel may be defined in the forward link to enable outer loop power control during DTX mode of the base station 14. However, other control signals from the base station 14 may be used, provided such control signals have a known state. To detect for errors, the mobile unit 16 includes an error detection circuit 121.

The detection and comparison acts at 208 and 210 may be performed in one of several ways. In one embodiment, a fixed number of bits in the pilot channel may be observed in a given time interval. The BER is then computed for that time window. The storage register 122 that records the result of a prior comparison may be cleared in preparation for the accumulation of bit errors in a disjoint time window. In another embodiment, a "sliding window" may be used in which the last N bits (samples) in the pilot channel are stored and the BER is updated with the arrival of each new pilot bit measurement. In further embodiments, other methods may be used to derive the BER from the sequence of pilot bit errors.

Based on the detection of error or lack thereof, the power control routine in the base station adjusts (at 212) the target Eb/No, once per frame interval. The target Eb/No is increased if the BER reported on each link is greater than the threshold value and decreased if one of them is lower than the threshold value. An "excessive BER event" is one in which the measured BER of a link is larger than the BER threshold. The up and down step sizes of the target Eb/No are derived from a desired probability of an excessive BER event in the same way that the step sizes are derived from the target FER in normal IS-2000 operation. Once the mobile unit comes out of DTX mode, the target Eb/No value that has been updated in the base station is used to generate (at 214) power control commands for the mobile unit, which are communicated to the mobile unit. The power control commands from the base station to the mobile unit controls the output power of the transmitter 118 (FIG. 2) in the mobile unit.

In the illustrated embodiment of FIG. 3, bit errors in the pilot channel are used to adjust the target Eb/No during DTX mode, but normal detection of traffic frame errors is used during non-DTX mode (i.e., during active transmission of traffic frames from the mobile unit to the base station). In another embodiment, the bit errors in the pilot channel can be used to perform adjustment of the target Eb/No whether the mobile unit 16 is in DTX mode or not.

The mechanism for detecting when a mobile has entered DTX mode (at 202 in FIG. 3) can be implemented in a number of different ways. A first mechanism is power detection based, and a second mechanism is signaling based.

With the power detection based mechanism, the receiver 124 in the base station 14 attempts to detect the traffic channel transmission disruption based on the received signal. In one embodiment, the power level (or Eb/No) of the traffic channel on the DCCH is used for detection since the power level is relatively high when traffic bits are sent and low when they are not. To account for power level variations with fading, the fading effect is eliminated by using the ratio of $(Eb/No)_{traffic}$ to $(Eb/No)_{pcb}$, where pcb stands for power control bits, as a decision variable. The ratio correlates fading over traffic bits with fading over power control bits in the same power control group.

The decision variable V is measured over a frame:

$$V = \frac{(Eb/No)_{traffic}}{(Eb/No)_{pcb}}, \qquad (Eq. 1)$$

The value of V is then compared to a pre-determined threshold T. If V is greater than T, then the receiver decides that a normal frame is being transmitted. If V is less than or equal to T, then the receiver assumes the current frame is a DTX frame, but still tries to detect the frame. If the frame is decoded correctly, then that frame is not really gated off (as is the case in DTX mode) so that it is determined that the mobile unit is not in DTX mode. However, if the detection of the frame indicates a bad frame, then the base station decides that the mobile unit is in DTX mode.

In the alternative mechanism, which is the signaling-based mechanism, one or two power control bits for each frame are used as a traffic channel transmission disruption indicator. In this way, the base station is informed whether the traffic channel in the frame is transmitting or not. For example, the first power control bit in a frame can be used to indicate the traffic channel status of the current frame. A "1" represents the presence of traffic channel, and a "0" stands for the traffic channel being gated off (in DTX mode). If the receiver detects a bit indicating that a normal frame is being transmitted, then the base station 14 determines that the mobile unit is not in DTX mode. However, if the detected bit indicates that the current frame is a DTX frame, then the receiver still tries to detect the frame (in case the detected bit is erroneous). If the frame is decoded correctly, then that means the frame is not really a DTX frame. However, if the detection indicates a bad frame, then DTX mode is detected.

By using embodiments of the invention, more effective power management is provided in each mobile unit. Adjustment of the Eb/No value during periods of traffic silence allows for reduction in power levels (and thereby increase the battery life of a mobile unit) while ensuring reliable communications due to traffic patterns and conditions after the mobile unit exits DTX mode and traffic signaling is started again. Although described in conjunction with the DTX mode of a mobile unit, the procedure described may be used for the base station if it is capable of entering DTX mode or some mode in which the base station stops sending traffic signaling. In further embodiments, the mobile communications system 10 may be a system other than a CDMA or CDMA 2000 system.

Various software routines or modules described herein are executable on control units in corresponding systems or nodes. Instructions of such software routines or modules may be stored in one or more storage units. Each control unit includes a microprocessor, a microcontroller, a processor card (including one or more microprocessors or microcontrollers), or other control or computing devices. As used here a "controller" refers to software, hardware, or a combination of both.

The storage units include one or more machine-readable storage media for storing data and instructions. The storage media include different forms of memory including semiconductor memory devices such as dynamic or static random access memories (DRAMs or SRAMs), erasable and programmable read-only memories (EPROMs), electrically erasable and programmable read-only memories (EEPROMs), and flash memories; magnetic disks such as fixed, floppy and removable disks; other magnetic media including tape; and optical media such as compact discs (CDs) or digital video discs (DVDs). Instructions that make up the various software routines or modules in various systems or nodes and stored in respective storage units when executed by a respective control unit cause the corresponding system or node to perform programmed acts.

The instructions of the software routines or modules are loaded or transported into the system or node in one of many different ways. For example, code segments including instructions stored on floppy disks, CD or DVD media, a hard disk, or transported through a network interface card, modem, or other interface device are loaded into the system and executed as corresponding software routines or modules. In the loading or transport process, data signals that are embodied in carrier waves (transmitted over telephone lines, network lines, wireless links, cables, and the like) may communicate the code segments, including instructions, to the system or node. Such carrier waves may be in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A system for use in a mobile communications system, comprising:
   a receiver to receive control signaling and traffic signaling from a mobile unit; and
   a controller to:
      detect whether the mobile unit is in discontinuous transmission mode,
      detect for error in the received control signaling from the mobile unit and to adjust a power control condition based on detected error in the received control signaling in response to detecting that the mobile unit is in the discontinuous transmission mode, and
      detect for error in the traffic signaling from the mobile unit and to adjust the power control condition based on detected error in the traffic signaling in response to detecting that the mobile unit is not in the discontinuous transmission mode.

2. The system of claim 1, wherein the control signaling comprises a pilot channel, and the controller is adapted to detect an error in the pilot channel and to adjust the power control condition based on the detected error in the pilot channel in response to detecting that the mobile unit is in the discontinuous transmission mode.

3. The system of claim 2, wherein the receiver is adapted to receive code-division multiple access control signaling.

4. The system of claim 3, wherein the receiver is adapted to receive IS-2000 control signaling.

5. The system of claim 1, wherein the traffic signaling is not transmitted during discontinuous transmission mode.

6. The system of claim 1, wherein the control and traffic signaling are communicated in a reverse link between the mobile unit and a base station.

7. The system of claim 1, wherein the power control condition comprises a target ratio of energy per bit to noise spectral density.

8. An article comprising one or more machine-readable storage media containing instructions for performing tasks in a mobile communications system, the mobile communications system having a mobile unit, a base station, and a link between the mobile unit and base station, the instructions when executed causing a controller to:
   determine whether the mobile unit is in discontinuous transmission mode;
   detect for one or more errors in control signaling received over the link;
   adjust a power control element based on the detected one or more errors in the control signaling if the mobile unit is in the discontinuous transmission mode;
   detect for one or more errors in traffic signaling received over the link; and
   adjust the power control element based on the detected one or more errors in the control signaling if the mobile unit is not in the discontinuous transmission mode.

9. The article of claim 8, wherein the one or more storage media contain instructions that when executed cause the controller to increase a target ratio of energy per bit to noise spectral density if an error rate exceeds a threshold.

10. The article of claim 9, wherein the one or more storage media contain instructions that when executed cause the controller to decrease the target ratio if the error rate does not exceed the threshold.

11. The article of claim 8, wherein detecting one or more errors in the control signaling comprises detecting one or more errors in control signaling received over a reverse wireless link from the mobile unit,
   wherein adjusting the power control element based on one or more errors in the control signaling of the reverse wireless link if the mobile unit is in discontinuous transmission mode.

12. The article of claim 8, wherein detecting one or more errors in the control signaling comprises detecting one or more errors in a pilot channel received over a reverse wireless link from the mobile unit,
   wherein adjusting the power control element comprises adjusting the power control element based on one or more errors in the pilot channel if the mobile unit is in discontinuous transmission mode.

* * * * *